MULTIPLE CODE SUBSCRIPTION TELEVISION SYSTEM

Filed Jan. 12, 1955

4 Sheets-Sheet 1

INVENTOR
WILLIAM J. SHANAHAN

BY Cushman, Darby & Cushman
ATTORNEYS

MULTIPLE CODE SUBSCRIPTION TELEVISION SYSTEM

Filed Jan. 12, 1955

INVENTOR
WILLIAM J. SHANAHAN

BY Cushman, Darby & Cushman
ATTORNEYS

INVENTOR
WILLIAM J. SHANAHAN
BY Cushman, Darby & Cushman
ATTORNEYS

INVENTOR
WILLIAM J. SHANAHAN

BY Cushman, Darby & Cushman
ATTORNEYS

United States Patent Office 3,106,604

Patented Oct. 8, 1963

3,106,604

MULTIPLE CODE SUBSCRIPTION TELEVISION SYSTEM

William J. Shanahan, New York, N.Y., assignor to Skiatron Electronics & Television Corporation, New York, N.Y., a corporation of New York Filed Jan. 12, 1955, Ser. No. 481,424

16 Claims. (Cl. 178—5.1)

This invention pertains to scrambled television systems and to transmitting and receiving apparatus therefor.

In copending applications of William J. Shanahan, Serial No. 255,555, filed November 9, 1951, now abandoned, Serial No. 316,485, filed October 23, 1952, William J. Shanahan et al., Serial No. 418,642, filed March 25, 1954, and William J. Shanahan, Serial No. 481,423, filed January 12, 1955, now Pat. No. 2,912,486, all assigned to the assignee of the present application, there are described scrambled television transmission systems, some characterized by a decoding operation using commutation devices at the transmitter and receivers, and others characterized jointly or solely by the transmission of signals constituting code groups for further effecting decoding or unscrambling at the receivers. The present invention pertains particularly to scrambled television transmission systems of the general types referred to, and wherein the televised image is capable of change among different modes from time to time at intervals less than a complete frame scan. The invention is adapted for changing the picture mode from line to line, although usually more than one line sweep is to elapse before a change of mode occurs. For carrying out this function, the invention includes mode circuits in the form of delay lines for variously delaying video signals at the transmitter and/or the receivers.

It is a primary object of this invention to provide an improved scrambled television system.

It is a further object to provide a system wherein the mode of the televised image is subject to change at a high repetition rate, for example, between line scans.

It is a further object of this invention to provide a scrambled television system wherein the modes of the image are subject to successive change according to a pre-arranged cycle plan, but wherein at variable and coded times the succession of mode changes may be interrupted and re-started.

It is an additional object of this invention to provide a scrambled television system wherein the establishing of modes of the televised image is subject to switching among a plurality of codes.

Further objects and the entire scope of the invention will become fully apparent upon reading the following detailed description and the appended claims.

Exemplary embodiments of the invention may be best understood with reference to the accompanying drawings, wherein.

The present application constitutes a continuation-in-part of my above mentioned application Serial No. 255,555 and application Serial No. 207,928, filed January 26, 1951, now abandoned.

Figures 1, 1A:
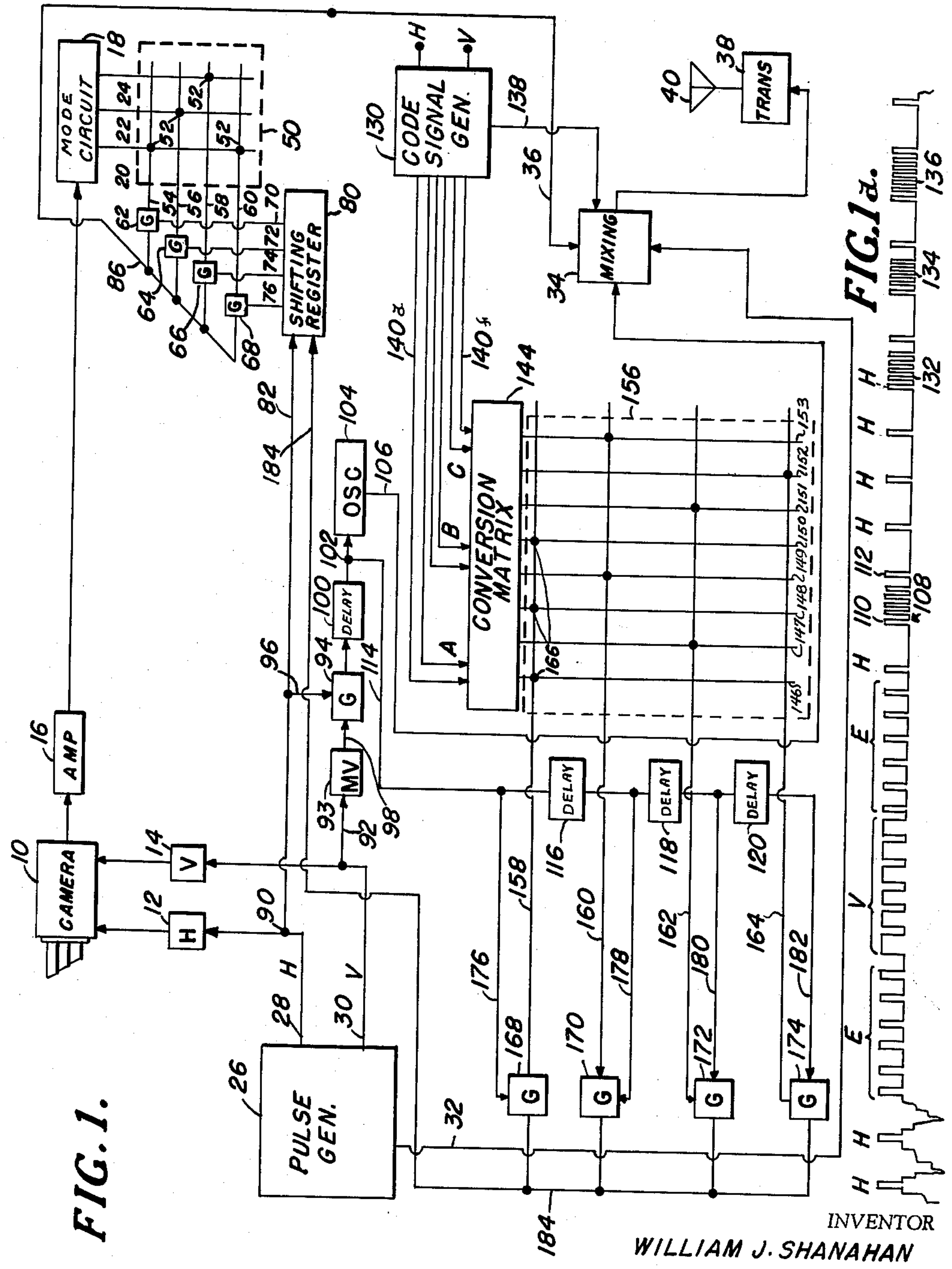
FIGURE 1 shows a transmitter equipment according to a first embodiment of the invention.

Now referring to FIGURE 1 a first exemplary embodiment of the invention is illustrated. A television camera 10 may be operated under the usual control of a horizontal sawtooth oscillator 12 and a vertical sawtooth oscillator 14 for developing the raster scanning sweeps. The video output may be amplified as desired in amplifier circuits 16 and presented to a mode creating circuit, which in this case is a delay line 18 having taps 20, 22 and 24 therealong, thus providing video delayed by a first amount on line 20, delayed by a second amount on line 22 and by a third amount on line 24. As will be understood, the maximum contemplated delay will be some fraction of a total line sweep interval. The matter of so delaying video for effecting various modes of the image with respect to a reference standard can be completely understood by study of the aforementioned patent applications.

The entire transmitting station may be under control of the usual master pulse generating circuits 26 which provide horizontal driving pulses on line 28, vertical driving pulses on line 30 and composite synchronizing signals on line 32. Signals on lines 28, 30 and 32 may be considered to be standard signals. The synchronizing signals on line 32 are applied to a mixing circuit 34 which is otherwise supplied with video signals in various modes on line 36 and still further component signals which will be described hereinbelow. It will be understood that all signals mixed for transmission will be applied to transmitter circuits 38 and finally to radiating antenna 40. Use may be made of the audio channel if desired and as explained in copending application Serial No. 316,485.

The variously delayed video signals on lines 20, 22 and 24 are applied to a switching matrix circuit within dash line 50. In circuit 50, dots 52 represent electrical connections to horizontally extending lines 54, 56, 58 and 60. Line 54 serves as a first enabling input to gate circuit 62, line 56 to gate 64, line 58 to gate 66, and line 60 to gate 68.

Second enabling inputs are applied to the just mentioned gates as follows: to gate 62 on line 70, to gate 64 on line 72, to gate 66 on line 74 and to gate 68 on line 76. The lines 70, 72, 74 and 76 are outputs of an electronic commutation circuit which will be described in more detail in the form of a shifting register circuit 80. The circuit 80 is of a type which successively provides a distinguished potential, such as a relatively high potential, on each of the just mentioned output lines in response to shifting of the register under control of input pulses on input line 82. A complete understanding of a representative shifting register may be had with reference to copending application Serial No. 481,423 and further explanation in this application is thought to be unnecessary. As in said application Serial No. 481,423, a pulse applied to a reset line (described hereinbelow) will serve to reset or return the shifting register immediately to its first stage or condition, that is, to energize line 76.

It will now be understood that when the shifting register 80 is so situated as to open gate 62, the delayed video signals will flow therethrough onto a collector bus 86 connected to the output thereof. The particular mode of video will be determined by the location of the connection to one of the output lines of the delay line 18 within the matrix 50.

As has been indicated hereinabove, it is the contemplation of the present invention that the mode of the televised image with respect to a reference such as the transmitted synchronizing signals is to be changed at intervals lesser than a complete frame scan period. Therefore, according to the invention, horizontal driving pulses are applied to shifting register circuit 80 by connection over line 82 to connection with line 28 at junction 90. It is to be understood that the term "mode" includes video inversion, delayed driving pulses, etc., and is not limited to delayed video. The latter is described in this application only by way of example.

Vertical driving pulses on line 30 may be further applied over line 92 as a trigger pulse to a monostable multivibrator circuit 93 which in turn enables a gate circuit 94 which has its second enabling input connected over line 96 to junction 90 in previously mentioned line 28 which carries horizontal driving pulses. During the existence of a pulse on line 98 at the output of circuit 93, the first occurring horizontal driving pulse on line 96 will pass through gate 94 and then through a delay circuit 100 so that there will appear at junction 102 a delayed driving pulse which by predetermined setting of the delay circuit 100 will appear simultaneously or just after one of the horizontal driving pulses occurring during the vertical retrace time. A blocking oscillator 104 set to oscillate at a given predetermined frequency, for example, 50 kilocycles, will create a burst of oscillations which will be applied over line 106 to the mixing circuits 34. The delay in circuit 100 will be adjusted so that the burst of oscillations will fall between two horizontal synchronizing pulses during the vertical retrace time. In other words, the pulse of oscillations on line 106 may be interleaved between two of the horizontal synchronizing pulses which exist following the group of equalizing pulses which follow the serrated vertical synchronizing pulse.

FIGURE 1A shows a time-amplitude plot of one side of the envelope of the conventional radiated synchronizing signals which occur in the vicinity of the vertical synchronizing signals. FIGURE 1A, which is similar to FIGURE 1A of the copending application, Serial No. 418,642, is set forth to illustrate an exemplary position of the burst of oscillation on line 106, which may be at 108 between horizontal pulses 110 and 112.

The pulse at junction 102 which triggered oscillator 104 is also applied over line 114 successively through delay circuits 116, 118 and 120. Each of these delay circuits may provide sufficient delay to place an imaginary burst of oscillations (or an actual burst at a different frequency from the burst 108) between other of the horizontal synchronizing pulses following burst 108 in FIGURE 1A. As will be apparent, the delay circuits 114, 116 and 118 will themselves serve the purpose without providing additional oscillators of the type of oscillator 104.

The transmitter equipment as shown in FIGURE 1 will further include coding circuits designated by reference character 130 for placing in the transmission as shown in FIGURE 1A bursts of distinguishable frequencies or pulse trains designated 132, 134 and 136. The circuits 130 may be according to those described in copending application Serial No. 418,642, or may be similar circuits described in copending application, Serial No. 316,485, which adds similar frequencies to the audio signals. The circuits 130 in FIGURE 1 of the present application if of the type of copending application, Serial No. 418,642, which places bursts of pulses between horizontal synchronizing pulses in the vertical retrace time, will also include memory circuits for maintaining a code during an entire frame.

As in copending applications, Serial Nos. 316,485 and 418,642, the necessary signals for transmission to the receiver may be applied to line 138 for application to the mixing circuits 34. Additionally, there will appear on six lines $140(a)$–$140(f)$ inclusive binary signals— that is, a binary potential condition on each line, on or off—so as to establish eight possible binary combinations according to the well known relationship $2^3=8$. The binary signals on lines $140(a)$–$140(f)$ may be applied to a code matrix circuit 144 for placing an enabling signal on one of eight output lines 146–153 inclusive. The matrix circuit 144 may be of any well known type and reference is made to applications Serial Nos. 316,485 and 418,642 for exemplary circuits, as well as to FIGURE 5 described hereinbelow. The lines 146–153 are within a matrix outlined by dash line 156. Also running through this matrix are lines 158, 160, 152 and 164. Each of the just mentioned lines may be connected to one or more of the output lines 146–153 of the matrix circuit 144 according to the dots 166 within the matrix. However, there should be but one connection from one of the output lines 146–153 to the lines 158, 160, 162 and 164.

Line 158 serves as a first input to gate 168, line 160 similarly connects to gate 170, line 162 to gate 172, and line 164 to gate 174. The output of delay 100 is connected over line 176 as a second enabling input to gate 168. The output of delay circuit 116 is connected over line 178 as a second input to gate 170. The output of delay circuit 118 is connected over line 180 as a second input to gate 172, and the output of delay circuit 120 is connected over line 182 as the second input to gate 174. The outputs of gates 168, 170, 172 and 174 are commonly connected to line 184 which is connected to the reset input of the shifting register circuit 80. It will now be apparent that in operation one of the lines 158, 160, 162 or 164 extending from the matrix 156 will carry an enabling potential, for example, a relatively high potential (during a frame interval by virtue of the operation of code circuits 130 and conversion matrix 144). It will be understood that by use of resettable switches, different code conditions may be established from time to time in the matrix 144 and the further matrix 156, in relation to the frequency bursts 132, 134 and 136 transmitted to the receivers. The output of matrix 156 as just referred to will enable one and only one of the gates 168, 170, 172 or 174. Accordingly, there will be applied to line 184 a shifting register reset signal which may be delayed with respect to the pulse on line 106 from blocking oscillator 104, which may be termed a reset control signal. This reset control signal is mixed in circuits 34 with the other signals and radiated to the receivers via antenna 40. Thusly, the situation which obtains in operation is that the shifting regster 80 is stepped by horizontal driving pulses and therefore may complete its cycle in a given number of line sweeps say four lines. However, the starting time of the cyclic operation of circuit 80 may be shifted from frame to frame by virtue of a reset pulse on line 184. As is fully explained in copending application Serial No. 481,423, the pulse on line 184 is capable of returning the shifting register circuit 80 immediately to its starting position, regardless of the particular stage of operation of the circuit 80 whereat the pulse on line 184 occurs. The coding is additionally complicated by the fact that the matrices 144 and 156 determine the time in relation to the transmitted reset control frequency originated in blocking oscillator 104.

Figure 2:
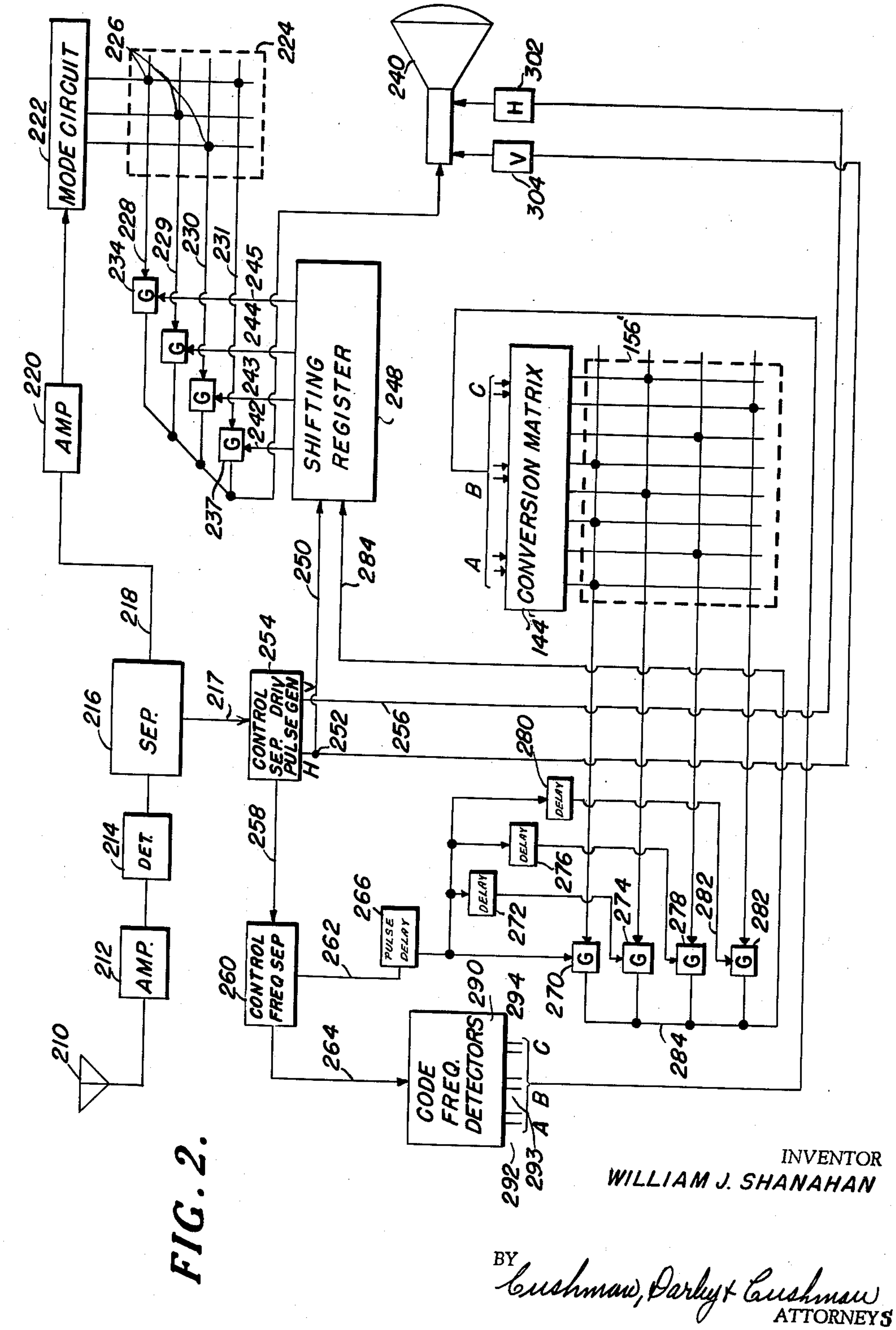
FIGURE 2 shows receiving equipment for use with the transmitting equipment of FIGURE 1.

Suitable exemplary receiving circuits are shown in FIGURE 2. As is conventional or will be understood from the above referred to copending applications, signals received at antenna 210 may be amplified in circuits 212, then detected in circuits 214 and finally applied to circuits 216 for separating the video signals from synchronizing signals, code signals and the reset control signals according to the present invention. The video signals may be applied over line 218 to video amplification circuits 220 as desired and finally to a delay circuit 222 similar to the delay circuit 18 of FIGURE 1. A matrix circuit 224 is provided in the output of delay circuit 222 and it will be understood that the connections as by dots 226 within the matrix 224 with horizontally extending output lines 228–231 inclusive must be such as to complement the delays established at the transmitter. That is, in systems of the type now being described wherein the modes are due to delayed video, and wherein the camera and the receiver display devices are driven by standard horizontal and vertical driving pulses, and the video is delayed by various amounts at the transmitter, a complementary delay is injected at the receiver so as to bring all of the delays to a standard amount for application to the receiver display means. The lines 228–231 inclusive serve as a first enabling input to gates 234–237 inclusive, respectively, and the outputs of these gates are connected in common to line 238 which is further connected to the beam intensity control means of the receiver display device 240. The second input to gates 234–237 inclusive are output lines 242–245 inclusive of a shifting register circuit 248. Shifting register 248 will be identical in function with register 80 of FIGURE 1. Shifting pulses are applied to register 248 over line 250, which is connected at junction 252 to the horizontal driving pulse output of a synchronizing pulse separator and driving pulse generator circuit 254, the latter being connected to the output of the synchronizing separator circuits 216 over line 217. Vertical driving pulses are available on line 256 from circuits 254 and a further output line 258 carries the various control frequencies, namely, the code frequencies 132, 134 and 136 (FIG. 1A) as well as the reset control frequencies 108 (FIG. 1A). Separator circuits 260 are provided for separating the reset control frequency from the code frequencies, these signals appearing on lines 262 and 264, respectively. The reset control frequency burst on line 262 may be applied to a pulse generating circuit 266 for generating a suitable square wave pulse on line 268. This pulse is applied directly to a first gate 270, through delay circuit 272 to gate 274, through delay 276 to gate 278 and through delay 280 to gate 282. The delay circuits 272, 276 and 280 are the counterparts of delay circuits 116, 118 and 120, respectively, of FIGURE 1. The outputs of gates 270, 274 and 282 are connected in common to line 284 which is connected as the reset pulse input to the shifting register 248.

The code frequencies on line 264 are applied to a code frequency detector circuit 290 which converts the condition of code frequencies 132, 134 and 136 (FIG. 1A) into binary coded signals on output lines 292, 293 294 otherwise indicated by legends A, B and C, respectively. These signals are again those of similar nature generated at the receiving circuits in copending applications, Serial Nos. 316,485 and 418,642. The signals A, B and C on lines 292–294 are conveyed over multiconductor line 296 as inputs to a code matrix circuit 144′ which is the same as circuit 144 of FIGURE 1. The eight output lines of circuit 144′ are applied to a matrix circuit 156′ which is the same as matrix circuit 156 of FIGURE 1. In a manner entirely similar to the arrangement in the transmitter circuits of FIGURE 1, the gates 270, 274, 278 and 282 are controlled by the horizontal extending output lines of matrix 156′.

Again, it will be understood that the matrices 224, 144′ and 156′ in the circuits of FIGURE 2 may have the necessary switching connections made by the use of insertable code bearing record cards, in conformity with the various copending applications mentioned hereinabove.

The receiver display device 240 in FIGURE 2 will be controlled by the usual horizontal sawtooth oscillator 302 and vertical sawtooth oscillator 304 which derive driving pulse inputs from the synchronizing signal separator circuits 254.

With joint reference to FIGURES 1 and 2 as described above, it will now be apparent that in operation the mode of the televised image with respect to a given reference such as the standard synchronizing signals transmitted to the receivers, changes more frequently than the frame interval. In the particular embodiment shown, every horizontal line pulse shifts the registers 80 and 248 respectively, therefore changing the mode every picture line. It will be understood that count-down circuits may be inserted in the input to register 80 so as to change the mode every fourth line, every fifth line, etc. Additionally, the remainder of the circuitry including the matrices 144, 144′ and 156, 156′ serves to change from frame to frame the starting or reset times of the registers. The great number of possible code situations that can be introduced into the circuitry by selection of the connections in the various matrices 50, 144, 156 at the transmitter and corresponding matrices 124, 144′ and 146′ at the receivers will be immediately apparent.

To trace a specific example of operation, let it be assumed that all horizontal driving pulses are applied over line 82 as shifting pulses to the shifting register 80, as is directly shown in FIGURE 1. As has been explained, a vertical driving pulse on line 30 will cause monostable multivibrator 93 to open gate 94 long enough to permit one of the horizontal driving pulses on line 96 to pass gate 94. This will be one of the horizontal pulses immediately following the group of equalizing pulses which, in turn, follow the serrated vertical synchronizing pulse (see FIG. 1A). After a delay generated in circuit 100 if desired, the oscillator 104 will be cycled, producing a burst of oscillations which will fall between two horizontal synchronizing pulses, as illustrated at 108 in FIGURE 1A. The groups of code frequencies 132, 134, 136 or whichever of these were transmitted during the preceding vertical interval to control matrix 144′ at the receiver, and similarly "controlling" the matrix 144 at the transmitter, will determine whether the delayed pulse at junction 102 will pass through gate 168, gate 170, gate 172 or gate 174. As has been explained hereinabove, the effect is that via line 184 a reset or re-start pulse will be applied to the shifting register 80 at the transmitter, at the time of the burst 108, or at the time of an imaginary burst falling between successive ones of the horizontal driving pulses as shown in FIGURE 1A. Whatever time the reset pulse on line 184 may occur, it will be observed that it will appear on line 184 just after a horizontal driving pulse on line 82 which, in effect, causes it to appear in advance of the next shifting pulse on line 82. Reference to the circuit of FIGURE 3 of my copending application Serial No. 481,423, filed January 12, 1955, the pulse on line 184 will be effective to shift the register back to its starting position, regardless of the particular stage whereat the pulse on line 184 finds the register. From there on, for the duration of the vertical period or other period whereat the code situation from circuits 130 changes, the shifting register will cycle, stepping line by line.

At the receiver as shown in FIGURE 2, detection of the control frequency burst 108 controls gates 270, 274, 278 and 282 in a manner similar to the control exercised over gates 168, 170, 172 and 174 at the transmitter of FIGURE 1. It should now be apparent that if the code signals have not been properly detected and eventually applied as input to gate 270 and its companion gates, the cycling of the shifting register 248 will not be interrupted and re-started in synchronism with the interruption of re-starting of the register 80 at the transmitter. Accordingly, the register 248 at the receiver will get out of step with the register at the transmitter and will remain out of step, resulting in a complete scrambling of the picture on the face of the display device 240.

Figures 3, 5, 5A:
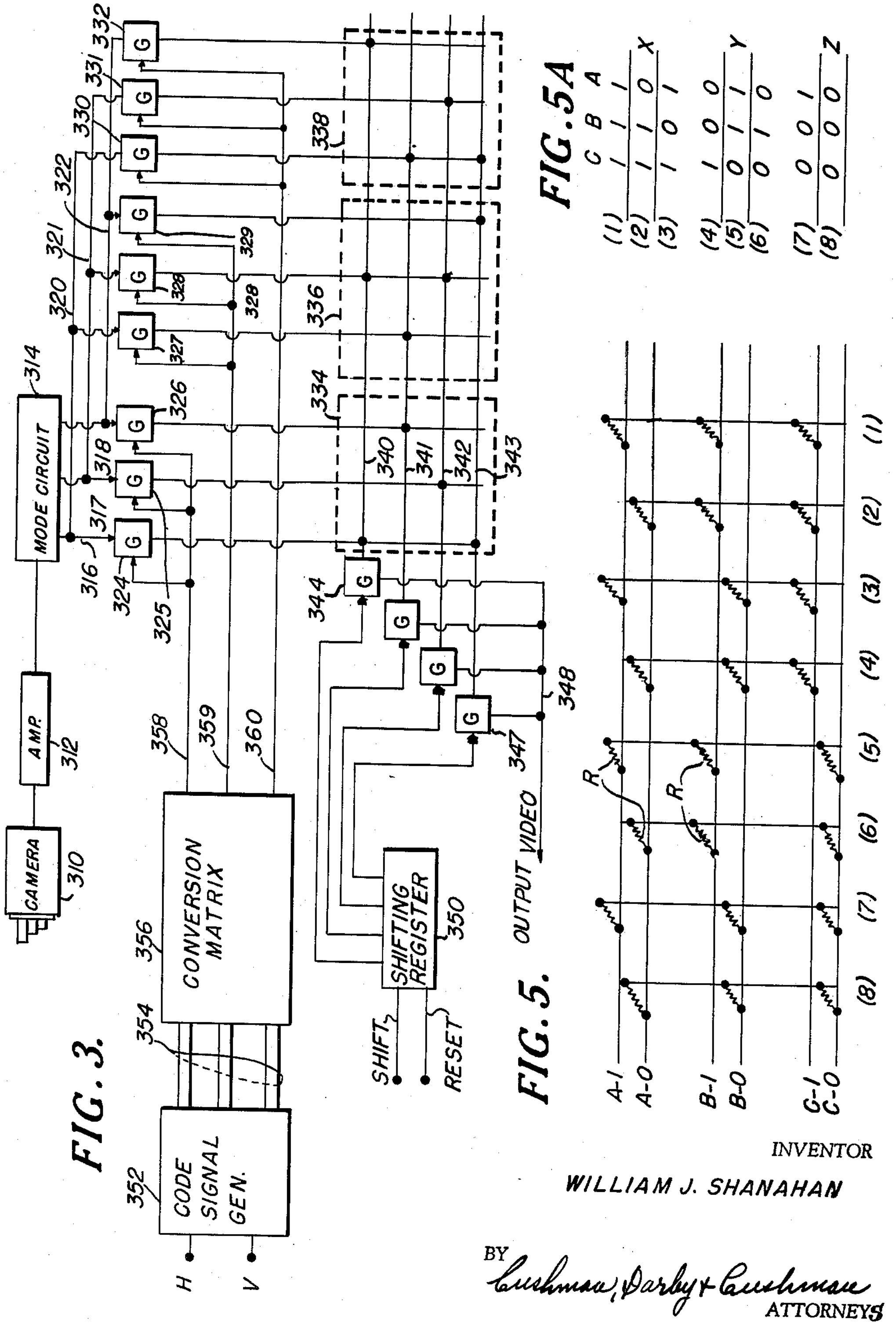
FIGURE 3 shows transmitting equipment according to another embodiment of the invention.
FIGURE 5 shows an exemplary matrix circuit for use at various points in the equipment illustrated in FIGURES 1–4 inclusive.
FIGURE 5A shows a binary chart useful in understanding FIGURE 5.
Figure 4:
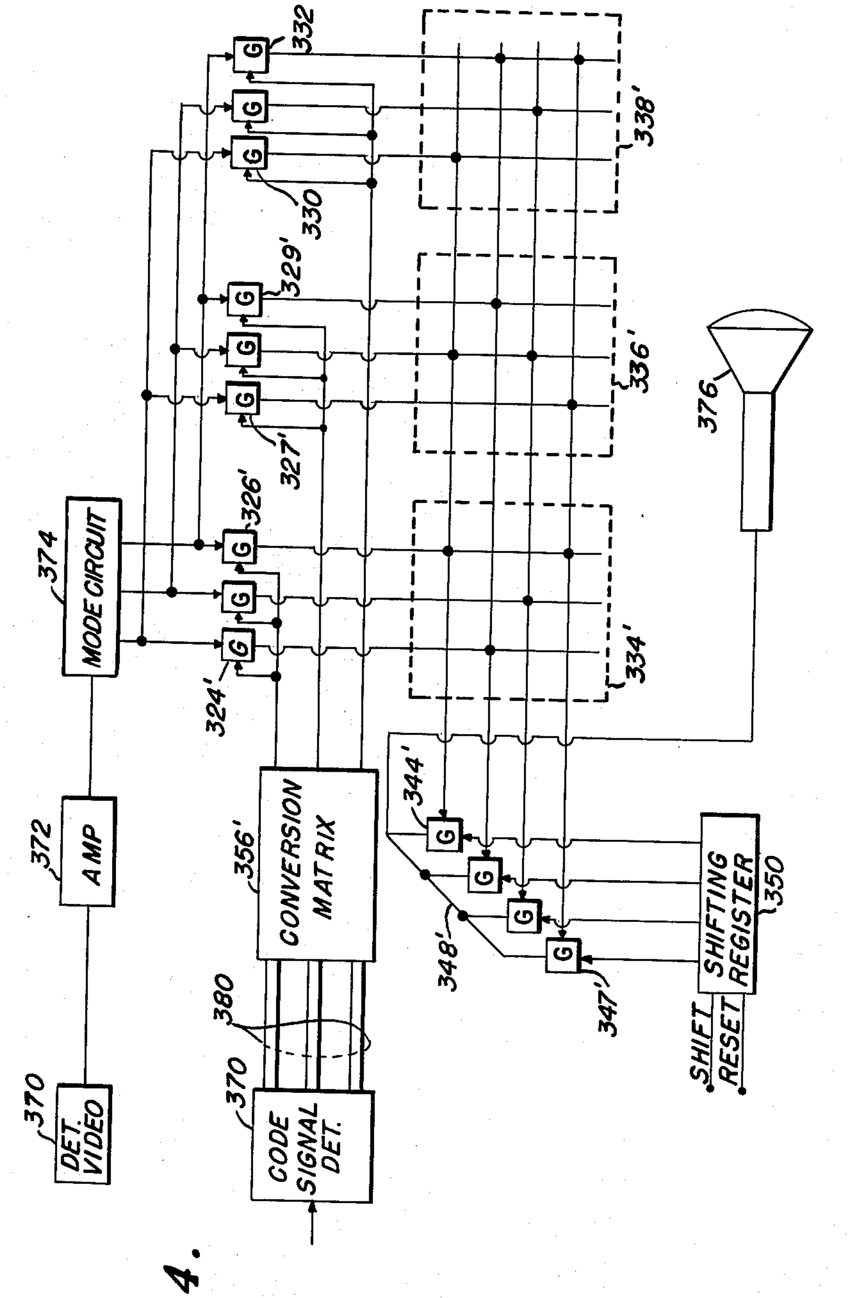
FIGURE 4 shows receiving equipment for use with the transmitting equipment of FIGURE 3.

An illustrative example of a further embodiment of the invention is shown in FIGURES 3 and 4. FIGURE 3 shows a transmitter apparatus and FIGURE 4 shows receiver apparatus therefor. Video signals from camera 310 are amplified as desired in circuits 312 and applied to a mode circuit which is in the form of a delay line 314 having taps on lines 316, 317, 318, all analogous to the arrangement of equipment in FIGURE 1. In the present embodiment, however, lines 320, 321 and 322 connect to lines 316, 317 and 318, respectively. Lines 316–318 serve as first enabling inputs to gates 324, 325 and 326, respectively. Further sets of gates 327, 328 and 329, and 330, 331 and 332 are connected in parallel with the first mentioned gates. The outputs of gates 324–326 serve a first matrix 334 which is similar to the matrix 50 of FIGURE 1. The second of gates 327–329 serve a similar matrix 336 and the gates 330–332 serve still another similar matrix 338. As represented by the dot connection within each matrix 334, 336 and 338, it is proposed that a different code connection array be established in each of the respective matrices.

Horizontally extending output lines 340, 341, 342 and 343 extend through all three matrices 334, 336 and 338, and these lines otherwise extend as inputs to gates 344–347 inclusive. The outputs of gates 344–347 are connected in common to line 348 which extends to mixing circuits (not shown) similar to mixing circuits 34 in FIGURE 1.

The second inputs to gates 344–347 inclusive are the output lines of a shifting register 350 similar to the shifting register 80 in FIGURE 1. The shifting and reset inputs to shifting register 350 may be as in FIGURE 1, or be, as for example, the inputs to the shifting registers of the transmitting apparatus in my copending application Serial No. 481,423. The point of importance in the present application with regard to the shifting register 350 and gates 344–347 is that line by line or at other line rate, shifting among various modes of the televised image may be accomplished.

In accordance with the embodiment of the present invention now being described with reference to FIGURE 3, it is proposed that at any given time and for the duration of say a frame scanning period, one and only one of the sets of gates 324–326, 327–329, or 330–332 will be enabled for passing signals representing possible modes of the televised image from circuit 314 to the thereto connected matrix 334, 336 or 338. To control the just enumerated sets of gates it is proposed that code signal generating circuits 352 may be provided, which circuits may be entirely analogous to those in copendng applications Serial No. 316,485 and Serial No. 418,642 which randomly or at predetermined rates establish binary code signals on six conductors such as the six conductors designated by reference character 354 in FIGURE 3. (For a suitable circuit see, for example, FIGURE 2 of copending application Serial No. 418,642 where such binary signals are established on the two-conductor lines 68, 70 and 72 as designated in said application.) The signals on the group of lines designated by reference character 354 may be applied to a conversion matrix circuit 356 for providing on three output lines 358, 359 and 360 signals so that one and only one of these lines is at a characteristic enabling potential, say a relatively high potential. Line 358 is connected in common as a first input to gates 324–326. Line 359 is connected in common as inputs to gates 327–329. Line 360 is connected in common as inputs to gates 330–332. With the specification that one and only one of lines 358–360 will be at a sufficiently high potential to open the set of gates connected thereto, it will be appreciated that at a given time, one and only one of the matrix circuits 334, 336 or 338 will be operable and will be controlling the mode-representing signals flowing to line 348. It will be further apparent that with change of the status of the signals on line of the group 354 from frame to frame or at other predetermined rate, the matrix 334, 336 or 338 in use will change. In other words, there is switching among the matrix circuits.

It will be understood that the conversion matrix 356 may be of any convenient type, such as one relying upon the principle of division of voltages across coupling resistors. A suitable circuit for this and other purposes will be described hereinbelow with reference to FIGURE 5.

FIGURE 4 shows apparatus for receiving signals generated by the apparatus of FIGURE 3. Video signals may be detected in circuit 370, amplified as desired in amplifier circuits 372 and applied to delay line 374, all analogous to similar components in FIGURE 2. The output of delay circuit 374 is directed in parallel to sets of gates similar to sets consisting of gates 324–326, 327–329 and 330–332, all designated in FIGURE 4 by the same reference characters primed, i.e., 324′. These gates serve matrix circuits similar to those in FIGURE 3, these matrix circuits now being designated 334′, 336′ and 338′. The counterpart shifting register is designated 350′ and has outputs connected to gates 344′–347′ with the output video signals collected on line 348′ for application to the receiver display device 376. It will be understood that the matrices 334′, 336′ and 338′ are connected to establish complementary delays so as to resolve the modes to present a steady picture on the face of the display device 376. For example, where the left-hand vertical input line to matrix 334 in FIGURE 3 connects to the input to gate 344 so as to provide the minimum video delay through gate 344 in FIGURE 4, the connection from gate 344′ is made to the right-hand vertical input line of matrix 334′ so as to provide the maximum delay, the total delay being equal to the standard delay which defines the left-hand margin of the image on the face of the display device 276. Complementary delay is further discussed in my above mentioned copending application Serial No. 481,423.

The receiver of FIGURE 4 will include a code signal detector circuit 378 which may be a circuit according to circuit 290 of FIGURE 2 and the illustrative examples in copending applications Serial No. 316,485 and Serial No. 418,642. Briefly stated, such circuits detect the representative code signals 132, 134 and 136 of FIGURE 1A as whether such signals are on or off, and apply binary coded signals on the conductors designated by reference character 380. Signals on conductors 380 may be applied to a matrix circuit 356′ corresponding to matrix circuit 356 of FIGURE 3. It will now be apparent that the receiver will follow the transmitter in switching among the matrices 334′, 336′ and 338′ to augment the decoding or unscrambling of the televised image.

It will be further understood that in keeping with the type of television systems of all of the heretofore mentioned copending patent applications, the switching connections in the matrices 334′, 336′ and 338′ may be made by use of replaceable record cards.

It will be apparent that the feature of the embodiments of FIGURES 1, 2 and FIGURES 3, 4 may be combined. That is, switching among matrices in FIGURES 3 and 4 may be in a system which also utilizes code signals to dictate the register reset times as described with reference to FIGURES 1 and 2.

The principles of a suitable conversion matrix for use in FIGURE 1 as matrix 144, in FIGURE 2 as matrix 144′, in FIGURE 3 as matrix 356 and in FIGURE 4 as matrix 356′ may be understood with reference to FIGURE 5 and to FIGURE 5A. In FIGURE 5 horizontally extending lines reading downwardly are designated by legends A–1, A–0; B–1, B–0; C–1, C–0, it being understood that these lines may constitute the "1" and "0" outputs of flip-flop circuits A, B and C (not shown). It is to be understood that whenever line A–1 carries a relatively high potential, line A–0 will carry the companion relatively low potential. The same applies for lines B and lines C. FIGURE 5A shows a binary chart wherein each vertical column is headed by A, B or C and the horizontal rows represent the combinations of these lines being in their "1" condition or "0" condition. According to the formula $2^3=8$ there are eight possible combinations numbered (1)–(8) inclusive. In FIGURE 5 vertically extending lines numbered (1)–(8) reading right to left are indicated and within the matrix thus formed connections are shown at certain places between the horizontal and vertical lines. These connections are exemplified by resistors R. The principle of operation may be understood by assuming that at a given time the potentials on input lines A–1, A–0, etc., are according to the (2) group shown in FIGURE 5A. That is, line A–0 is at its high potential, line B–1 is at its high potential, and line C–1 is at its high potential. With resistor connection between line A–0 and the (2) line, the B–1 line and the (2) line and the C–1 line and the (2) line all of the voltages applied to the horizontal line input of the connecting resistors R will be at the highest possible potential and accordingly the line (2) will be at that potential. In FIGURE 5 for the remaining vertical lines, resistor connection to horizontal lines is shown according to the other groups of FIGURE 5A. If any other vertical line is now taken as an example for analysis with the potential on lines A, B and C as above stated, it will be found that the horizontal line connection to at least one of the connecting resistors is at the opposite or relatively lower potential. This results in a voltage division across the three connecting resistors R involved, meaning that each of the other vertically extending lines will be at a potential at least one step below the highest possible potential. Therefore, so long as the gates connected to the vertically extending lines are adjusted so as to remain unopened until the highest possible voltage level is reached, only a gate as connected to vertical line (2) in the given example will be enabled.

The foregoing description has been given only for purpose of explanation and the scope of the invention is to be determined from the appended claims.

What is claimed is:

1. In transmitting means for a scrambled picture transmission system, means for generating picture signals, means coupled thereto for generating a plurality of different modes of said picture signals, and means coupled to and responsive to the aforesaid means for transmitting a different mode of the picture signals during different time periods which occur at a rate sufficient to render an unauthorized receiver display unintelligible, means including commutation means for selecting from time to time which of said modes is transmitted, means for transmitting mode control signals for maintaining receiver commutation means in synchronism with said transmitter commutation means, means coupled to the commutation means for generating commutation control signals to control the transmitter commutation means, and encoding means interconnecting the last two recited means, the encoding means including means for providing a changeable time delay between the transmitted commutation signals and the commutation control signals.

2. Transmitting means as in claim 1 wherein the means for transmitting said mode control signals includes means for generating and transmitting a coded complex signal combination the characteristics of which convey the encoded time delay relationship between the transmitter commutation control signals and said transmitted mode control signals.

3. Transmitting means as in claim 1 wherein the commutation control signal generating means generates from time to time different combinations of binary signals on a plurality of lines, the encoding means is responsive to said signals on said lines for converting the binary signals into a steady state potential on one of a plurality of lines, and the encoding means further includes a matrix coupled to the last mentioned plurality of lines and a plurality of gates each having an input line connected in said matrix.

4. Transmitting means as in claim 3 wherein the commutation control signal generating means includes a chain of delay circuits connected thereto in series, the outputs of predetermined ones of the delay circuits being connected as second inputs to said gates, the arrangement being such that different control signals from the commutation control signal generating means open a different one of said gates to the exclusion of others for given time periods, the arrangement being such that commutation control signals of different predetermined time delays in relation to transmitted mode control signals control the commutation means.

5. In apparatus for a scrambled picture transmission system, means for producing picture signals, means for utilizing the picture signals, means coupled with the picture signal producing means for generating a plurality of different modes of said picture signals, means coupled with the mode generating means for selecting a different mode of the picture signals for utilization during different time periods, means including commutation means having a plurality of different states for operating said selection means from time to time to select different modes for utilization, means for providing mode control signals for control of the commutation means, means including changeable matrix means connected between the mode generating means and the commutation means for determining which mode is utilized for a given state of the commutation means, said mode determining means including a plurality of groups of parallel paths for picture signals in the respective modes to said utilization means, means coupled to and responsive to the means for providing mode control signals for determining which of said paths is operative, each path including a separate portion of said changeable matrix means, and means coupled with said means for providing mode control signals for selecting from time to time the group of paths utilized.

6. In transmitting means for a scrambled picture transmission system, means for generating picture signals, means coupled thereto for generating a plurality of different modes of said picture signals, means for transmitting a different mode of said picture signal during different time periods which occur at a rate sufficient to render an unauthorized receiver display unintelligible, means including multiple state commutation means for selecting from time to time which of said modes is transmitted, means for transmitting mode control signals for maintaining synchronization of commutation means at receivers, means including changeable matrix means connected between the mode generating means and the commutation means for determining which mode is transmitted for each state of the commutation means, said mode determining means including a plurality of parallel paths for each picture mode signal between the mode generating means and the picture signal transmitting means, each separate parallel path for each mode signal including connection in a separate portion of said changeable matrix means, and means for opening a different set of said parallel paths from time to time.

7. Transmitting means as in claim 6 wherein the picture signal mode generating means has a plurality of output lines, wherein the mode determining means includes a plurality of groups of gates, each group having a plurality of gates therein, the respective gates of each group being connected in parallel to the respective output lines of the mode generating means, wherein the commutation means includes a plurality of output lines, gating means in each commutation output line for being enabled by outputs of the commutation means one at a time, said changeable matrix means including changeable matrix interconnection means between the outputs of each group of gates responsive to the mode generation means and second inputs to the gating means responsive to the commutation means, the output of the commutation responsive gating means being connected in common to the picture signal transmitting means, the mode determining means further including means for opening a different group of said gates responsive to the mode generating means from time to time, the arrangement being such that cycling of the commutation means during given different time periods causes transmission of the respective picture modes through different ones of said groups of gates.

8. In transmitting apparatus for a scrambled picture transmission system, means for generating picture signals, means coupled thereto for generating a plurality of different modes of said picture signals, means for transmitting a selected mode of said picture signals, means for generating and transmitting mode control signals, and mode determining means for selecting a mode to be transmitted, said mode determining means comprising a plurality of sets of parallel paths coupled between the mode generating means and the picture signal transmitting means, each set including a different path for each different generated mode, means for enabling a different set of said paths from time to time, and means including commutation means responsive to said mode control signals and changeable matrix means for selecting from time to time a different path from at least an enabled set thereof, each separate path including a connection in a separate portion of said changeable matrix means.

9. Apparatus as in claim 8 wherein the picture signal mode generating means has a plurality of output lines, the path set enabling means includes a plurality of groups of gates, the gates in each group being respectively coupled to said output lines, the means including commutation means includes another plurality of output lines, gating means in each commutation output line for being enabled by outputs of the commutation means one at a time, and a group of parallel paths serving respectively as inputs to said gating means, and said changeable matrix means includes a different changeable matrix interconnection means between the outputs of each group of said gates and said group of parallel paths, the outputs of said gating means being connected in common to the picture signal transmission means.

10. In receiving means for receiving a scrambled picture transmission wherein picture signals are transmitted in one of a plurality of different modes during different time periods which occur at a rate sufficient to render an unauthorized receiver display unintelligible and wherein mode control signals are transmitted representing the operation of commutation means at the transmitting means; means for resolving the different modes of said picture signals, means coupled to the resolving means and including commutation means for selecting from time to time the mode resolved in the resolving means, means for detecting the mode control signals and means coupled and responsive thereto for generating commutation control signals to control the receiver commutation means, and decoding means interconnecting the last two recited means, the decoding means including means for providing a changeable time delay between the transmitted mode control signals and the means for generating receiver commutation control signals.

11. Receiving means as in claim 10 wherein the means for detecting the transmitted mode control signals includes means for generating combinations of binary signals on a plurality of lines and wherein the decoding means includes conversion means connected to said lines for converting the binary coded signals into a signal on one of a plurality of lines, and the decoding means further includes a plurality of gates each having one input connected to predetermined ones of said output lines from the conversion means, and wherein the means for detecting the mode control signals further includes a chain of delay circuits the output of predetermined ones of which provide second inputs to said gates, the arrangement being such that the detected mode control signals opens one of said gates to the exclusion of others for passing a pulse of predetermined delay with respect to the transmitted mode control signal for controlling the receiver commutation means.

12. Receiving means for receiving a scrambled picture transmission wherein picture signals are transmitted in one of a plurality of different modes during different time periods which occur at a rate sufficient to render an unauthorized receiver display unintelligible and wherein complex mode control signal combinations are transmitted representing the operation of commutation means at the transmitting means; means for resolving the different modes of said picture signals, means coupled to the resolving means and including commutation means for determining from time to time the mode resolved in the resolving means, and means for detecting the transmitted mode control signals for controlling the receiver commutation means, the last mentioned means including changeable matrix means for decoding the complex mode control signal combinations.

13. Receiving means for receiving a scrambled picture transmission wherein picture signals are transmitted in different modes during different time periods and wherein mode control signals are included for maintaining synchronization of commutation means at receivers; means for resolving the different modes of said picture signals, means including commutation means for determining from time to time the mode resolved in the resolving means, means including changeable matrix means connected between the mode resolving means and the commutation means for determining which mode is resolved for each state of the commutation means, utilization means for displaying the picture signals as a picture, said mode determining means including a plurality of parallel paths for each mode signal between the mode resolving means and picture signal utilization means, each separate parallel path for each mode signal including connection in a separate portion of the said changeable matrix means, and decoding means for enabling a different one set of said parallel paths from time to time.

14. Receiving means as in claim 13 wherein the mode resolving means has a plurality of output lines, wherein the mode determining means includes a plurality of groups of gates, each group having a plurality of gates therein, the respective gates of each group being connected in parallel to the respective output lines of the mode generating means, wherein the commutation means includes a plurality of output lines, gating means in each commutation output line for being enabled by outputs of the commutation means one at a time, said changeable matrix means including changeable matrix interconnection means between the outputs of each group of gates responsive to the mode resolution means and second inputs to the gating means responsive to the commutation means, the output of the commutation responsive gating means being connected in common to picture signal utilization means, the mode determining means further including means for opening a different group of said gates responsive to the mode generating means from time to time, the arrangement being such that cycling of the commutation means during given different time periods causes transmission of the respective resolved picture modes through different ones of said groups of gates.

15. Receiving apparatus for receiving a scrambled picture transmission wherein picture signals are transmitted in different modes during different time periods and wherein mode control signals are included in the transmission for indicating operation of transmitter commutation means, comprising means for resolving the different modes of said picture signals, utilization means for displaying a selected mode of picture signals as a picture, and mode determining means for selecting a mode to be displayed, said mode determining means including a plurality of sets of parallel paths coupled between the mode resolving means and said utilization means, each set including a different path for each different mode, means for enabling a different set of said paths from time to time, means for detecting the mode control signals and means including commutation means responsive to said mode control signals and changeable matrix means for selecting from time to time a different path from at least an enabled set thereof, each separate path including a connection in a separate portion of said changeable matrix means.

16. Receiving apparatus as in claim 15 wherein the mode resolving means has a plurality of output lines, the path set enabling means includes a plurality of groups of gates, the gates in each group being respectively coupled to said output lines, the means including commutation means includes another plurality of output lines, gating means in each commutation output line for being enabled by outputs of the commutation means one at a time, and a group of parallel paths serving respectively as inputs to said gating means, and said changeable matrix means includes a different changeable matrix interconnection means between the outputs of each group of said gates and said group of parallel paths, the outputs of said gating means being connected in common to said utilization means.

References Cited in the file of this patent

UNITED STATES PATENTS

| | | |
|---|---|---|
| 2,414,101 | Hogan et al. | Jan. 14, 1947 |
| 2,472,744 | Mayle | June 7, 1949 |
| 2,510,046 | Ellett et al. | May 30, 1950 |
| 2,656,407 | Herrick et al. | Oct. 20, 1953 |
| 2,664,460 | Roschke | Dec. 29, 1953 |
| 2,697,741 | Roschke | Dec. 21, 1954 |